(12) United States Patent
Bauer et al.

(10) Patent No.: US 9,130,967 B2
(45) Date of Patent: Sep. 8, 2015

(54) METHOD AND SYSTEM FOR NETWORK ELEMENT SERVICE RECOVERY

(75) Inventors: Eric Bauer, Freehold, NJ (US); Daniel W. Eustace, Naperville, IL (US); Randee Susan Adams, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 767 days.

(21) Appl. No.: 12/948,452

(22) Filed: Nov. 17, 2010

(65) Prior Publication Data

US 2012/0124413 A1 May 17, 2012

(51) Int. Cl.
| | |
|---|---|
| *G06F 11/16* | (2006.01) |
| *H04L 29/08* | (2006.01) |
| *H04Q 3/00* | (2006.01) |
| *H04L 29/14* | (2006.01) |

(52) U.S. Cl.
CPC ........ *H04L 67/1095* (2013.01); *H04L 67/1034* (2013.01); *H04L 69/40* (2013.01); *H04Q 3/0062* (2013.01)

(58) Field of Classification Search
USPC ....................................................... 714/1–57
See application file for complete search history.

(56) References Cited

U.S. PATENT DOCUMENTS

| | | | |
|---|---|---|---|
| 6,182,139 B1 * | 1/2001 | Brendel ........................ 709/226 |
| 6,421,688 B1 * | 7/2002 | Song ..................................... 1/1 |
| 6,625,750 B1 * | 9/2003 | Duso et al. ....................... 714/11 |
| 7,574,499 B1 * | 8/2009 | Swildens et al. .............. 709/223 |
| 8,266,473 B2 | 9/2012 | Casale et al. |
| 8,775,589 B2 | 7/2014 | Liss et al. |
| 2003/0105981 A1 * | 6/2003 | Miller et al. ................... 713/202 |
| 2004/0111652 A1 | 6/2004 | Shoaib et al. |
| 2004/0193969 A1 * | 9/2004 | Nemoto et al. ............... 714/100 |
| 2006/0271813 A1 * | 11/2006 | Horton et al. ...................... 714/4 |
| 2008/0126833 A1 * | 5/2008 | Callaway et al. .................. 714/4 |
| 2009/0006885 A1 | 1/2009 | Pattabhiraman et al. |
| 2011/0060941 A1 * | 3/2011 | Hatasaki et al. ............. 714/4.11 |

FOREIGN PATENT DOCUMENTS

| | | |
|---|---|---|
| CN | 101390336 A | 3/2009 |
| CN | 101627379 A | 1/2010 |
| WO | WO 01/42908 A2 | 6/2001 |
| WO | WO2006/017199 A2 | 2/2006 |

OTHER PUBLICATIONS

International Search Report and Written Opinion for PCT/US2011/059918 dated Mar. 12, 2012.

* cited by examiner

*Primary Examiner* — Nadeem Iqbal

(74) *Attorney, Agent, or Firm* — Fay Sharpe LLP

(57) ABSTRACT

A method and system for network element recovery are provided. In one form, frontend servers intelligently proxy error or unavailability messages returned by backend servers and simulate frontend server failure. In at least one form, the frontend server also includes intelligence or logic to determine that directing the client to recover service to an alternate system or site would assure better service availability, reliability, and/or quality-of-experience for the client.

22 Claims, 4 Drawing Sheets

METHOD AND SYSTEM FOR NETWORK ELEMENT SERVICE RECOVERY

FIELD OF THE INVENTION

This invention relates to a method and system for network element service recovery. While the invention is particularly directed to the art of network client service recovery, and will be thus described with specific reference thereto, it will be appreciated that the invention may have usefulness in other fields and applications.

BACKGROUND

By way of background, many modern systems are implemented by integrating several network elements, such as a frontend web server that interacts with a backend database server. When these systems provide critical services, they are often replicated on multiple sites to maximize service availability, especially following failures of networking equipment or facilities, or other externally attributable events that render site hosting equipment unavailable or inaccessible. While failures (e.g., profound unavailability/non-responsiveness) of the frontend machines facing client devices (e.g., web browsers) may be automatically detected by the client and trigger the client to automatically recover service to an alternate site, failures of backend servers typically will not trigger client initiated recovery. For example, if the database server supporting an e-commerce site is unavailable, then the typical implementation would simply return a webpage to the client saying the site was temporarily unavailable and to try again later. Thus, standard practice today is for complex, multi-element solutions to return descriptive errors to clients (for failure of backend elements that do not directly communicate with clients).

If a backend server (such as a database) fails, a traditional strategy is to leverage geographically distributed redundant systems. In this regard, the frontend server (e.g. a web server) recovers service onto the redundant database server on a geographically remote site. However, this causes messages to be sent between two geographically remote sites. If these sites are far apart, and there are many messages needed between the web server and the database, this can significantly increase the response time of the web server and use significant bandwidth between sites. Thus, this solution might increase delay and network traffic if the element is located in a remote site.

SUMMARY

A method and system for network element service recovery are provided. Standard practice today is for complex, multi-element solutions to return descriptive errors to clients (for failure of backend elements that do not directly communicate with clients) rather than to manipulate the errors to trigger automatic service recovery. While fully descriptive errors are informative to some classes of users, many other users would rather have their (smart) client device automatically recover service for them.

In one embodiment, the method comprises detecting by the frontend server of an error in or unavailability of a downstream network element, and, sending a response code to the client to trigger the client to redirect service to or recover on an alternate frontend server.

In another embodiment, the frontend server is a web server.

In another embodiment, the downstream network element is a database server.

In another embodiment, the method further comprises suspending the session between the client and the frontend server.

In another embodiment, the detecting comprises one of receiving a message from the downstream network element or detecting a timed out response timer.

In another embodiment, the method comprises detecting by the frontend server an error in or unavailability of a downstream network element, determining whether element recovery or cluster recovery should be performed, if element recovery is determined, switching over by the frontend server to an alternate downstream network element corresponding to the failed downstream network element, and, if cluster recovery is determined, sending a response code by the frontend server to the client to trigger the client to redirect service to or recover on an alternate redundant frontend server.

In another embodiment, the frontend server is a web server.

In another embodiment, the downstream network element is a database server.

In another embodiment, the method further comprises suspending the session between the client and the frontend server.

In another embodiment, the detecting comprises one of receiving a message from the downstream network element or detecting a timed out response timer.

In another embodiment, the determining is based on data traffic.

In another embodiment, the system comprises a control module of the frontend server detecting an error in or unavailability of a downstream network element and sending a response code to the client to trigger the client to redirect service to or recover on an alternate frontend server.

In another embodiment, the frontend server is a web server.

In another embodiment, the downstream network element is a database server.

In another embodiment, the frontend server detects the error by receiving a message from the downstream network element or detecting a timed out response timer.

In another aspect, the client, frontend server, downstream network elements, alternate frontend server and alternate downstream network elements are IMS elements.

In another embodiment, the system comprises a control module of the frontend server detecting an error in or unavailability of a downstream network element, determining whether element recovery or cluster recovery should be performed, if element recovery is determined, switching over by the frontend server to an alternate downstream network element corresponding to the failed downstream network element and, if cluster recovery is determined, sending a response code by the frontend server to the client to trigger the client to redirect service to or recover on an alternate frontend server.

In another embodiment, the frontend server is a web server.

In another embodiment, the downstream network element is a database server.

In another embodiment, the frontend server detects the error by receiving a message from the downstream network element or detecting a timed out response timer.

In another embodiment, the frontend server detecting is based on data traffic.

In another embodiment, the client, frontend server, downstream network elements, alternate frontend server and alternate downstream network elements are IMS elements.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE FIGURES

Some embodiments of apparatus and/or methods in accordance with embodiments of the present invention are now described, by way of example only, and with reference to the accompanying drawings, in which.

DETAILED DESCRIPTION

Figure 1:
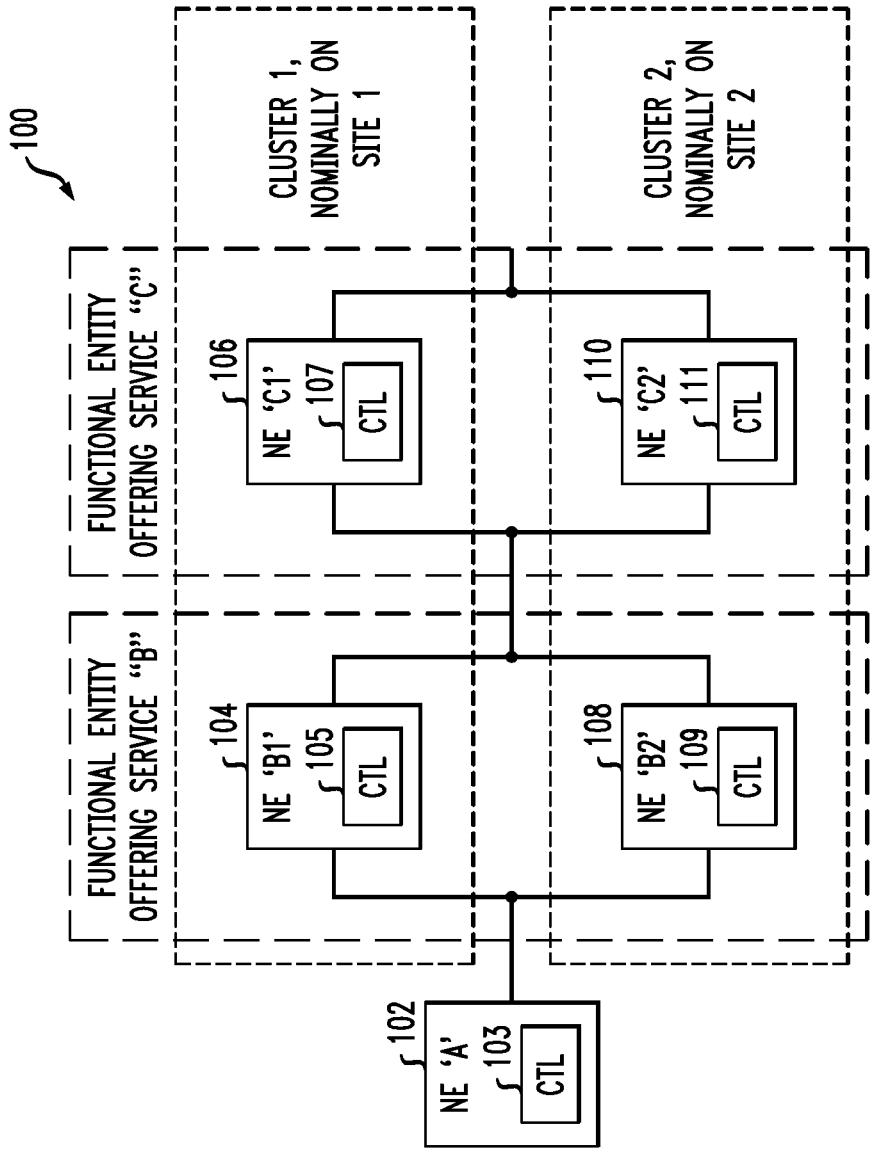
FIG. 1 is a block diagram of an example system into which the presently described embodiments may be incorporated.

According to the presently described embodiments, in the event of a failure or unavailability of a downstream element in a network, frontend servers (e.g., web servers) trigger the client to attempt automatic recovery or redirection to an operational system/site (e.g., a redundant or alternate path or cluster) rather than simply return a static error statement or other terminal response to the client. A goal is to automatically recover or redirect service to an available system/site to avoid a longer service outage while the failed or unavailable server is repaired or recovered.

In this regard, according to the presently described embodiments, frontend servers intelligently proxy error messages returned by backend servers (i.e., downstream servers that typically do not directly interact with client) and simulate or spoof circumstances to redirect service away from the frontend (e.g., server failure or overload conditions). In at least one form, the frontend server also includes intelligence or logic to determine that redirecting the client to recover service to an alternate (i.e., georedundant) system or site would assure at least one of better service availability/reliability/quality-of-experience for the client.

In general, application protocols generally support different types of response codes, some of which are essentially terminal or descriptive (e.g., web page not found, user not authorized, gateway failed) and some of which may trigger the client to take some recovery action to the same or different server (e.g., move temporarily, service unavailable, too busy, try again, . . . etc.). According to the presently described embodiments, the frontend server maps potentially recoverable errors or difficulties from backend systems into messages, such as response codes returned to the client. These mapped response codes trigger the client to retry their request to an alternate system/site. Thus, according to the presently described embodiments, rather than having the webserver front end map a database server failure or condition of unavailability into, for example, an error webpage for the client to display, the frontend webserver simulates a circumstance (e.g., a failure) that causes the client to recover or redirect service to a fully operational system/site.

It should be appreciated that the types of response codes referenced above, as examples of codes or messages used to implement the presently described embodiments, may vary by application. For example, when a downstream failure is detected by the frontend server, a code indicating a profound problem, such as a 503 Service Unavailable code, may be repurposed by the frontend server and transmitted by the frontend server to the client to simulate its own failure to trigger a switch-over. Similarly, when a downstream overload condition (or other condition that will make a downstream element unavailable) is detected, the frontend server may transmit a redirection response, such as 302 Moved Temporarily code, to the client to trigger redirection to the alternate cluster.

In a further example, the frontend server may transmit a redirection response, such as 302 Moved Temporarily code, in all circumstances of unavailability including a failure or other conditions of unavailability. This scenario would negate the need for use of codes indicating profound problems (such as the 503 Service Unavailable codes noted above) to implement the presently described embodiments.

In a further example, a code indicating a profound problem, such as a 503 Service Unavailable code, may be repurposed by the frontend server and transmitted by the frontend server to the client to simulate its own failure to trigger a switch-over in all circumstances of unavailability, including a failure or other conditions of unavailability.

Referring now to the drawings wherein the showings are for purposes of illustrating the exemplary embodiments only and not for purposes of limiting the claimed subject matter, FIG. 1 provides a view of a system 100 into which the presently described embodiments may be incorporated. As illustrated, the system 100 includes a network element or client A (102) in communication, or conducting a session, with a functional entity that offers service "B." This functional entity includes a network element or server B1 (104) and a network element or server B2 (108). The noted functional entity offering service B is in communication with a functional entity offering service "C." This functional entity includes a network element or server C1 (106) and a network element or server C2 (110). As shown, these elements C1 and C2 are downstream relative to the elements B1 and B2.

Further, each network element is shown to include a control module, e.g. control modules 103, 105, 107, 109 and 111. The control modules are understood to provide functionality to the network elements and, in some embodiments, house and/or execute suitable routines to realize the functionality of the presently described embodiments. For example, frontend server B1 (104) includes a control module 105 that, in at least one form, is operative to execute routines corresponding to methods according to the presently described embodiments, including the methods hereafter described in connection with FIGS. 2-5.

In the configuration shown, it should be appreciated that the network elements B2 and C2 serve as alternate redundant elements (also referred to as alternate elements or redundant elements) for network elements B1 and C1, respectively. In this regard, it should be appreciated that such alternate servers or redundant servers or alternate redundant servers do not necessarily exactly replicate the primary server to which it corresponds. It should also be understood that a network element may have more than one corresponding alternate redundant element, although only one corresponding alternate redundant element (e.g. for B1 and C1) is shown herein for ease of reference. As shown, elements B1 and C1 form a cluster of geographically close elements, and elements B2 and C2 form a cluster of geographically close elements. In at least one example form, the network elements B1 and B2 function as frontend servers such as web servers while the network elements C1 and C2 function as backend servers such as database servers. It should be appreciated that, although a single frontend server (B1 or B2) is shown (for ease of reference), there is not necessarily only a single frontend server in a solution. A complex service (e.g., an IP Television head end) might be implemented across a whole suite of servers, which could be logically organized into smaller clusters of systems within the broader solution. Each of those smaller clusters could have a system serving as a frontend server. This includes the recursive case of having smaller cluster with frontend servers inside of larger clusters with different frontend servers.

Of course, other types of network elements can be used as well, including IP Multimedia Subsystem (IMS) elements. Also, it should be appreciated that various signaling protocols may be used, including Session Initiated Protocol (SIP). Still further, it should be appreciated that network elements may serve as a client for one purpose but a server for another purpose. Accordingly, the configuration shown should be understood to be merely an example. Also, along these same lines, FIG. 1 includes redundant elements C1 and C2, but it should be understood that redundant element D1 and D2, E1 and E2, . . . etc. (not shown) could also be in the system. All of the primary elements (B1, C1, etc), in at least one form, are assumed to be located in a first cluster (cluster 1) at one site and all of the redundant elements (B2, C2, etc), in at least one form, are assumed to be located in a second cluster (cluster 2) on a second site.

There is typically only one recovery option from failure of an 'edge' element of the cluster that directly interacts with the client (e.g., if 'B1' fails, then client must recover to 'B2'). However, according to the presently described embodiments, there are two recovery options for failure of an element inside the edge. In this regard, one can potentially organize clusters of elements into recovery groups to enable faster or better recovery.

Figure 2:
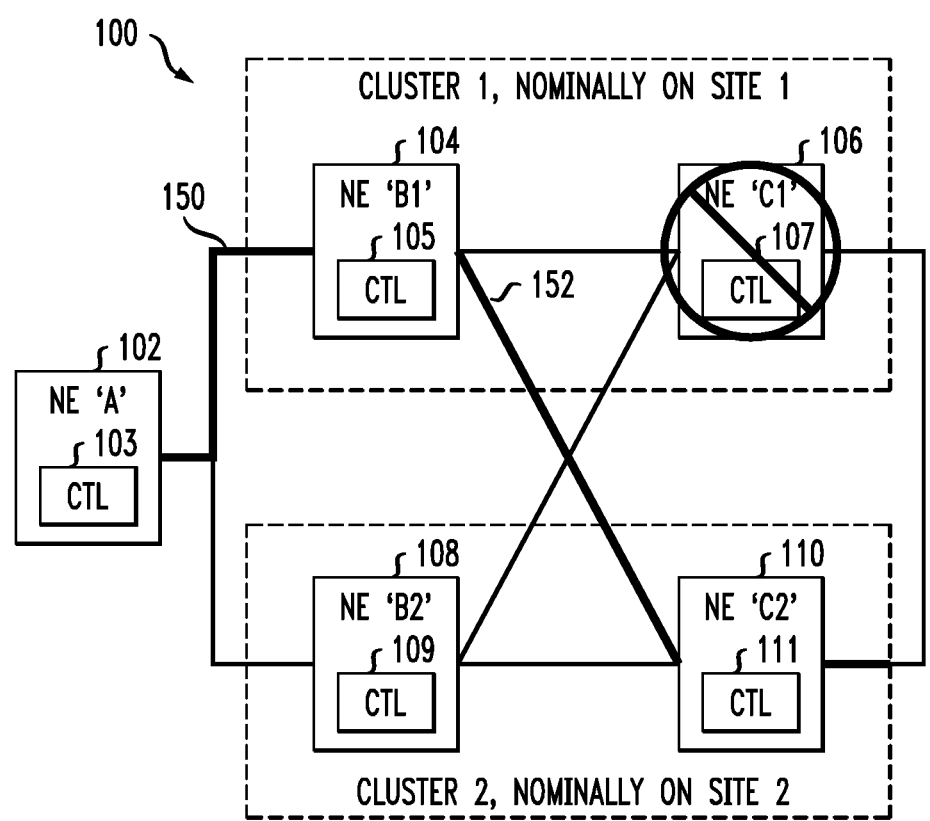
FIG. 2 is a block diagram illustrating an example operation of the system of FIG. 1.

With reference to FIG. 2, a technique using element recovery for the system is illustrated. In this regard, failure of non-edge element C1 can be recovered by element B1 switching to element C2. Ideally, element B1 detects the failure fast enough and recovers sufficient session context with element C2 so that the recovery is transparent to client A. As can be seen, element A1 still communicates with element B1 on path 150, but element B1 communications with element C2 on path 152.

Figure 3:
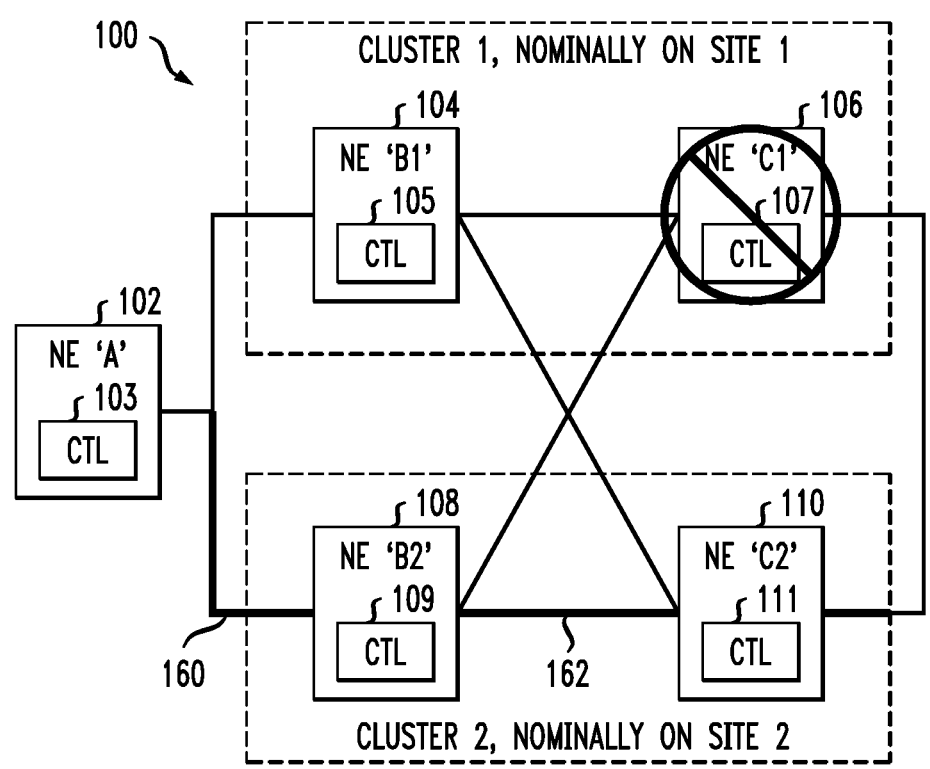
FIG. 3 is a block diagram illustrating an example operation of the system of FIG. 1.

With reference to FIG. 3, a technique using cluster recovery for the system is illustrated. In this regard, failure or unavailability of non-edge element C1 can be recovered or addressed by switching or redirecting the client A away from cluster 1 to cluster 2. In this case, client A is explicitly involved in reestablishing service to element B2. Failure or unavailability of element C1 is explicitly communicated to client A via a profound response code (e.g., 503 Service Unavailable or a redirection response such as 302 Moved Temporarily) that is returned by element B1 to client A in response to failure or unavailability of element C1, and the client A is expected to initiate recovery to an alternate cluster. In this case, after recovery, client A communicates with element B2 on path 160 and element B2 communications with element C2 on path 162. Note that, in cluster recovery, the edge and/or other elements explicitly proxy the failure or unavailability response back to the client (e.g. client A) rather than itself attempting recovery. The client then redirects or switches over to the alternate cluster. In addition, implicit failures (e.g., timeout expirations, loss of heartbeat) are likewise translated into appropriate explicit failures which are proxied back to the client so that the client may redirect or switch over service.

Note that the distinction between element and cluster recovery can appear different to various elements in the solution. For example, while element B1 executes element recovery from C1 to C2 in FIG. 2, client A should be unaware any recovery action was taken. Likewise, cluster recovery from site 1 to site 2 in FIG. 3 may appear to client A merely as element recovery to B2 after an apparent failure of B1.

It should be appreciated that the presently described embodiments may be implemented in a variety of manners. For example, a method of the presently described embodiments, may include the functionality of the frontend server performing a cluster recovery technique for errors or other responses that it receives. In a further embodiment, the frontend server may also execute logic or have intelligence to make a determination whether element recovery or cluster recovery should be implemented with respect to a particular error or response detection. In either case, it will be appreciated that the methods according to the presently described embodiments may be realized in the system in a variety of manners. In this regard, a variety of software routines or hardware configurations may be used. For example, a software routine performing the methods of the present application may be housed on and/or executed by a control module of a frontend server, such as control module 105 of frontend server B1 (104). Of course, such routines may also be distributed within the network on appropriate network elements, some of which are not shown in FIG. 1.

Figure 4:
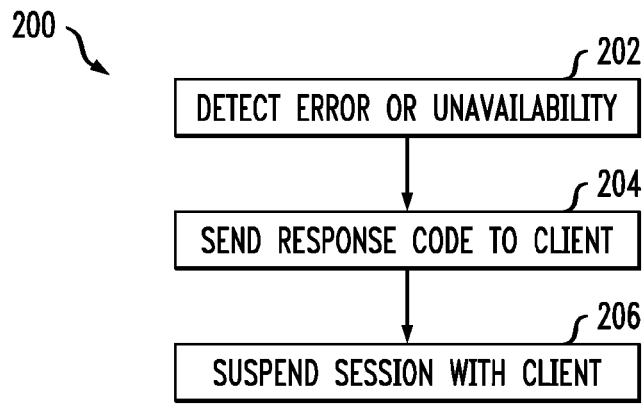
FIG. 4 is a flow chart illustrating an example method according to the presently described embodiments.
Figure 5:
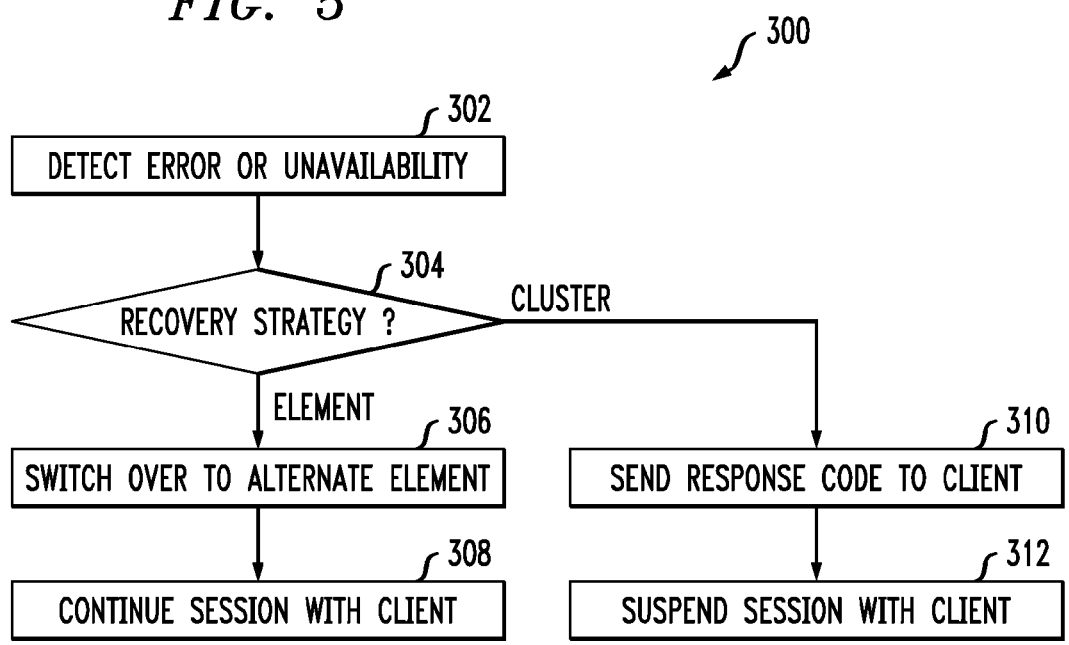
FIG. 5 is a flow chart illustrating an example method according to the presently described embodiments.

Accordingly, with reference now to FIG. 4, a method 200 according to the presently described embodiments is shown. The method 200 includes detecting errors or unavailability from a downstream network element (at 202). Such detection could be accomplished in a variety of conventional manners. For example, the error or unavailability could be detected upon receipt of an explicit message or an implicit indicator (e.g. a timing out of a response timer). Upon detection, the frontend server performs a cluster recovery technique. That is, the frontend server sends a failure or redirect message to the client to trigger the client to switch over to the alternate, redundant frontend server in the system (at 204). The failure or redirect message could take a variety of forms (e.g., 503 Service Unavailable or a redirection response such as 302 Moved Temporarily). In this manner, the frontend server simulates a condition of failure or unavailability so that the client completely switches over or redirects service to the redundant path (e.g., switches over to an alternate redundant frontend server, thus switching over to an alternate cluster). Also, the session between the client and the original frontend server is suspended in favor of the client redirecting service to the alternate server (at 206). In some embodiments, an overloaded server might simply redirect a few service requests to an alternate server during brief periods of overload. Thus, primary server continue carrying the bulk of a client's traffic, but a few transactions are covered by other servers to assure acceptable quality of service (rather than delivering degraded service during brief periods of overload).

As noted above, the frontend server may also include logic or intelligence to determine the appropriateness of using cluster recovery or element recovery. In this regard, with reference to FIG. 5, a method 300 is illustrated. The method 300 is initiated upon detection of an error or unavailability in a downstream network element (at 402). Such error detection could be accomplished in a variety of conventional manners. For example, the error or unavailability could be detected upon receipt of an explicit message or an implicit indicator (e.g., a timing out of a response timer). At this point, the frontend server determines a recovery strategy (at 304). Of course, in at least one form, the frontend server determines whether an element recovery process or a cluster recovery process will be performed. This determination could be accomplished in a variety of manners. For example, the frontend server may take into account the amount of data exchanged with the failed or unavailable server (or data traffic). If the data exchange rate (or data traffic) is relatively low, based on a threshold value that may be adaptively or periodically set, or based on the running of a subroutine, the frontend server may determine that element recovery is better for the system. In other circumstances, based on similar criteria, the frontend server may determine that cluster recovery is to be conducted.

If an element recovery process is determined, the frontend server simply switches over to communicate with the alternate redundant network element corresponding to the failed network element (at 306). The frontend server continues the session with the client (at 308).

If, however, the frontend server determines at 304 that cluster recovery is to be performed, the frontend server sends a failure or redirect message to the client (at 310). The failure or redirect message could take a variety of forms (e.g., 503 Service Unavailable or a redirection response such as 302 Moved Temporarily). Of course, as noted above, the failure or redirect message will trigger the client to redirect to the redundant, alternate server path or cluster. The session between the client and the frontend server is suspended (at 312). As above, in some variations, an overloaded server might simply redirect a few service requests to an alternate server during brief periods of overload. Thus, primary server continue carrying the bulk of a client's traffic, but a few transactions are covered by other servers to assure acceptable quality of service (rather than delivering degraded service during brief periods of overload).

In other variations of the presently described embodiments, solutions with more than two elements (e.g., D1/D2, E1/E2, etc) deploy hybrid recovery strategies in which some element failures are mitigated via element recovery and some are mitigated via cluster recovery. Such a scenario may utilize a method similar to that shown in FIG. 5. In addition, recovery clusters can be smaller than the suite of all solution elements on a site, thus a failure of one element on site 1 could cause some service to be recovered onto a small recovery cluster of elements on site 2 while other elements on site 1 continue delivering service.

The presently described embodiments can be illustrated with a specific example. In this regard, one of the priorities of cluster recovery is to configure each element to send its service requests to local servers first and remote servers if none of the local servers are available. One way to accomplish this is with DNS SRV records, which allow a priority to be assigned to each server in a fully qualified domain name (FQDN) pool. With this configuration, when an element fails and service is switched to the remote site, that element will send its own requests to other elements in the remote site. With most communication between elements occurring within the same site, latency is not increased as much as for simple element switchover.

In the example above, the FQDNs for the C1/C2 servers can be implemented this way. Typically, if the client fails over to server B2, then server B2 will automatically use local server C2. However, if the client is using server B1 and server C1 fails or becomes unavailable, then server B1 will begin sending its requests to server C2. Since this traffic will flow between geographically remote sites, additional bandwidth will be used and the latency of these requests will increase. In order to conduct a cluster failover according to the presently described embodiments, server B1 must have special software logic, for example (as described herein), to handle C server failures differently. After detecting the failure of server C1, server B1 needs to explicitly return a response code to the client that was defined to trigger it to initiate a recovery or redirection to an alternate server. For example, if the protocol between the client and B1 is SIP, then B1 server could return a "503 Service Unavailable" or a "302 Moved Temporarily" response to trigger the client to failover to the remote site.

A person of skill in the art would readily recognize that steps of various above-described methods can be performed by programmed computers (e.g. control modules 103, 105, 107, 109 or 111). Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, the functions of the various elements shown in the Figures, including any functional blocks labeled as network elements, clients or servers may be provided through the use of dedicated hardware, as well as hardware capable of executing software and associated with appropriate software. When provided by a processor, the functions may be provided by a single dedicated processor, by a single shared processor, or by a plurality of individual processors, some of which may be shared. Moreover, explicit use of the term "processor" or "controller" or "controller module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for network element service recovery in a network including a client operative to conduct a session with a frontend server connected to downstream network elements and at least one alternate frontend server connected to alternate downstream network elements, the method comprising:
   detecting by a frontend server of an error in or unavailability of a downstream network element; and,
   sending a response code to the client to trigger the client to redirect service to or recover on an alternate frontend server.

2. The method as set forth in claim 1 wherein the frontend server is a web server.

3. The method as set forth in claim 1 wherein the downstream network element is a database server.

4. The method as set forth in claim 1 further comprising suspending the session between the client and the frontend server.

5. The method as set forth in claim 1 wherein the detecting comprises one of receiving a message from the downstream network element or detecting a timed out response timer.

6. A method for network element service recovery in a network including a client operative to conduct a session with a frontend server connected to downstream network elements and at least one alternate frontend server connected to alternate downstream network elements, the method comprising:
- detecting by the frontend server an error in or unavailability of a downstream network element;
- determining whether element recovery or cluster recovery should be performed;
- if element recovery is determined, switching over by the frontend server to an alternate downstream network element corresponding to the failed or unavailable downstream network element; and,
- if cluster recovery is determined, sending a response code by the frontend server to the client to trigger the client to redirect service to or recover on an alternate frontend server.

7. The method as set forth in claim 6 wherein the frontend server is a web server.

8. The method as set forth in claim 6 wherein the downstream network element is a database server.

9. The method as set forth in claim 6 further comprising suspending the session between the client and the frontend server.

10. The method as set forth in claim 6 wherein the detecting comprises one of receiving a message from the downstream network element or detecting a timed out response timer.

11. The method as set forth in claim 6 wherein the determining is based on data traffic.

12. A system for network element service recovery in a network including a client operative to conduct a session with a frontend server connected to downstream network elements and at least one alternate frontend server connected to alternate downstream network elements, the system comprising:
- a control module of a frontend server detecting an error in or unavailability of a downstream network element and sending a response code to the client to trigger the client to redirect service to or recover on an alternate frontend server.

13. The system as set forth in claim 12 wherein the frontend server is a web server.

14. The system as set forth in claim 12 wherein the downstream network element is a database server.

15. The system as set forth in claim 12 wherein the frontend server detects the error or unavailability by receiving a message from the downstream network element or detecting a timed out response timer.

16. The system as set forth in claim 12 wherein the client, frontend server, downstream network elements, alternate frontend server and alternate downstream network elements are IMS elements.

17. A system for network element service recovery in a network including a client operative to conduct a session with a frontend server connected to downstream network elements and at least one alternate frontend server connected to alternate downstream network elements, the system comprising:
- a control module of the frontend server detecting an error in or unavailability of a downstream network element, determining whether element recovery or cluster recovery should be performed, if element recovery is determined, switching over by the frontend server to an alternate downstream network element corresponding to the failed or unavailable downstream network element and, if cluster recovery is determined, sending a response code by the frontend server to the client to trigger the client to redirect service to or recover on an alternate frontend server.

18. The system as set forth in claim 17 wherein the frontend server is a web server.

19. The system as set forth in claim 17 wherein the downstream network element is a database server.

20. The system as set forth in claim 17 wherein the frontend server detects the error or unavailability by receiving a message from the downstream network element or detecting a timed out response timer.

21. The system as set forth in claim 17 wherein the frontend server detecting is based on data traffic.

22. The system as set forth in claim 17 wherein the client, frontend server, downstream network elements, alternate frontend server and alternate downstream network elements are IMS elements.

* * * * *